(12) United States Patent
Radhakrishnan (10) Patent No.: US 9,632,813 B2
(45) Date of Patent: Apr. 25, 2017

(54) HIGH AVAILABILITY FOR VIRTUAL MACHINES IN NESTED HYPERVISORS

(71) Applicant: VMWARE, INC., Palo Alto, CA (US)

(72) Inventor: Smitha Radhakrishnan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/828,531

(22) Filed: Aug. 18, 2015

(65) Prior Publication Data

US 2016/0371110 A1  Dec. 22, 2016

(30) Foreign Application Priority Data

Jun. 22, 2015 (IN) .......................... 3125/CHE/2015

(51) Int. Cl.
*G06F 9/455* (2006.01)
(52) U.S. Cl.
CPC .. *G06F 9/45558* (2013.01); *G06F 2009/4557* (2013.01)
(58) Field of Classification Search
None
See application file for complete search history.

(56) References Cited

U.S. PATENT DOCUMENTS

| | | | |
|---|---|---|---|
| 2012/0278801 A1* | 11/2012 | Nelson | G06F 9/45533 718/1 |
| 2016/0147556 A1* | 5/2016 | Hu | G06F 9/45558 718/1 |

OTHER PUBLICATIONS

VMware "vSphere Availability," 2013.*

* cited by examiner

*Primary Examiner* — Sisley Kim (57) ABSTRACT

Techniques for providing high availability to virtual machines executing in a nested hypervisor. A high availability agent executing within a slave computer in a cluster detects when a master server becomes unavailable and restarts virtual machines from the master server in response. The high availability agent detects whether any of the virtual machines were executing a nested hypervisor within the master server and starts a high availability agent within such hypervisors. The high availability agent within the nested hypervisor is a modified high availability agent with respect to the high availability agent executing in physical servers. The modified high availability agent does not participate in master election and also cannot elect the virtual machine on which it runs as master.

20 Claims, 6 Drawing Sheets

HIGH AVAILABILITY FOR VIRTUAL MACHINES IN NESTED HYPERVISORS

RELATED APPLICATIONS

Benefit is claimed under 35 U.S.C. 119(a)-(d) to Foreign application Ser. No. 3125/CHE/2015 filed in India entitled "HIGH AVAILABILITY FOR VIRTUAL MACHINES IN NESTED HYPERVISORS", on Jun. 22, 2015, by VMware, Inc., which is herein incorporated in its entirety by reference for all purposes.

BACKGROUND

Computer virtualization is a technique that involves encapsulating a physical computing machine platform into a virtual machine that is executed under the control of virtualization software on a hardware computing platform. Virtualization software enables multiple virtual machines (VMs) to be run on a single hardware computing platform, and can manage the allocation of computing resources to each virtual machine. A software module referred to as a hypervisor manages execution of virtual machines on a physical computing machine platform.

High availability software provides features that detect failure of a computer system executing VMs and perform a failover operation in response that restarts virtual machines on another server. In some virtualization environments, virtual machines have the capability to execute "nested hypervisors," which are hypervisors that run on the virtualized hardware environment of a virtual machine. In the past, high availability has generally not been available for virtual machines run by nested hypervisors.

SUMMARY

A method is provided. The method includes storing, within a shared storage device that is shared between a cluster of hosts, a heartbeat file configured to indicate availability status for hypervisors executing on physical hosts and nested hypervisors executing on virtual machines (VMs). The method also includes detecting, based on the heartbeat file, that a first nested hypervisor that is included within the nested hypervisors, that is executing a first virtual machine (VM), and that is executing on the first host has become unavailable. The method further includes in response to determining that the first nested hypervisor has become unavailable, starting the first VM within a second nested hypervisor executing on a second host within the cluster of hosts.

A computer system is provided. The computer system includes a first hardware computing platform configured to execute a first hypervisor. The first hypervisor is configured to execute a first virtual machine configured to execute a nested hypervisor that is configured to execute a first nested high availability agent and a first high availability agent. The computer system also includes a second hardware computing platform configured to execute a second hypervisor, the second hypervisor configured to execute a second high availability agent. The computer system also includes a shared storage device configured to be accessed by both the first hardware computing platform and the second hardware computing platform. The first hardware computing platform and the second hardware computing platform are included within a cluster. The first hardware computing platform and the second hardware computing platform are part of a cluster of hardware computing platforms. Each of the first high availability agent, the first nested high availability agent, and the second high availability agent update are configured to update a heartbeat file stored in the shared storage device, the heartbeat file configured to indicate availability status for hypervisors executing on hardware computing platforms and nested hypervisors executing on virtual machines. The second hardware computing platform is configured to detect, based on the heartbeat file, that the first virtual machine has become unavailable. The second hardware computing platform is configured to, in response to detecting that the first virtual machine has become unavailable, start the first virtual machine with a second nested hypervisor executing within a second virtual machine configured to execute on the second hypervisor.

A non-transitory computer-readable medium storing instructions that, when executed by a processor, cause the processor to perform a method is provided. The method includes storing, within a shared storage device that is shared between a cluster of hosts, a heartbeat file configured to indicate availability status for hypervisors executing on physical hosts and nested hypervisors executing on virtual machines (VMs). The method also includes detecting, based on the heartbeat file, that a first nested hypervisor that is included within the nested hypervisors, that is executing a first virtual machine (VM), and that is executing on the first host has become unavailable. The method further includes in response to determining that the first nested hypervisor has become unavailable, starting the first VM within a second nested hypervisor executing on a second host within the cluster of hosts.

DETAILED DESCRIPTION

Figure 1:
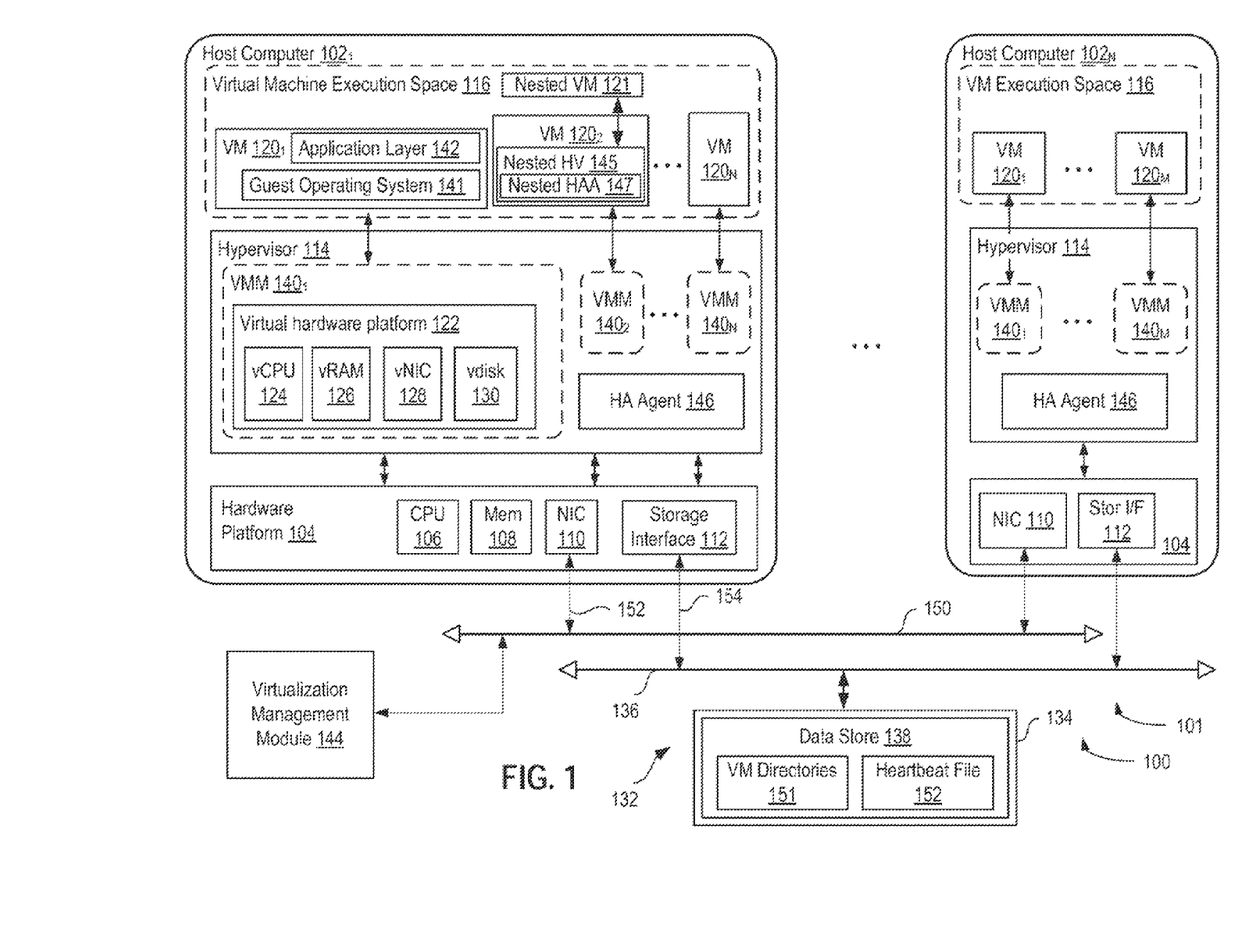
FIG. 1 is a block diagram that illustrates a virtualized computing system with which one or more embodiments of the present disclosure may be utilized.

FIG. 1 depicts a block diagram of a virtualized computing system 100 in which one or more embodiments of the present disclosure may be practiced. The computing system 100 includes one or more host computer systems 102$_1$ to 102$_N$, collectively identified as host computers 102. Host computer system 102 may be constructed on a desktop, laptop, or server grade hardware platform 104 such as an x86 architecture platform. As shown, hardware platform 104 of each host 102 may include conventional components of a computing device, such as one or more processors (CPUs) 106, system memory 108, a network interface 110, a storage interface 112, and other I/O devices such as, for example, a mouse and keyboard (not shown). Processor 106 is configured to execute instructions, for example, executable instructions that perform one or more operations described herein and may be stored in memory 108 and in local storage. Memory 108 is a device allowing information, such as executable instructions, cryptographic keys, virtual disks, configurations, and other data, to be stored and retrieved. Memory 108 may include, for example, one or more random access memory (RAM) modules. Network interface 110 enables host 102 to communicate with another device via a communication medium, such as network 150. An example of network interface 110 is a network adapter, also referred to as a Network Interface Card (NIC). In some embodiments, a plurality of NICs is included in network interface 110. Storage interface 112 enables host 102 to communicate with one or more network data storage systems that may, for example, store virtual disks that are accessed by virtual machines. Examples of storage interface 112 are a host bus adapter (HBA) that couples host 102 to a storage area network (SAN) or a network file system interface. In some embodiments, storage interface 112 may be a network-enabled storage interface such as Fibre Channel, and Internet Small Computer system Interface (iSCSI).

In the embodiment shown, data storage for host computer 102 is served by a SAN 132, which includes a storage array 134 (e.g., a disk array), and a switch 136 that connects storage array 134 to host computer system 102 via storage interface 112. SAN 132 is accessible by both a first host $102_1$ and a second host $102_N$ (i.e., via respective storage interfaces 112), and as such, may be designated as a "shared storage" for hosts 102. In one embodiment, storage array 134 may include a datastore 138 configured for storing virtual machine files and other data that facilitates techniques for virtual machine migration, as described below. Switch 136, illustrated in the embodiment of FIG. 1, is a SAN fabric switch, but other types of switches may be used. In addition, distributed storage systems other than SAN, e.g., network attached storage, may be used.

A virtualization software layer, also referred to hereinafter as hypervisor 114, is installed on top of hardware platform 104. Hypervisor 114 supports a virtual machine execution space 116 within which multiple VM processes may be concurrently executed to instantiate VMs $120_1$-$120_N$. For each of VMs $120_1$-$120_N$, hypervisor 114 manages a corresponding virtual hardware platform 122 that includes emulated hardware such as a virtual CPU 124, virtual RAM 126 (interchangeably referred to as guest physical RAM or vRAM), virtual NIC 128, and one or more virtual disks or hard drive 130. For example, virtual hardware platform 122 may function as an equivalent of a standard x86 hardware architecture such that any x86 supported operating system, e.g., Microsoft Windows®, Linux®, Solaris® x86, NetWare, FreeBSD, etc., may be installed as a guest operating system 141 to execute any supported application in an application layer 142 for a VM 120. Device driver layers in guest operating system 141 of VM 120 includes device drivers (not shown) that interact with emulated devices in virtual hardware platform 122 as if such emulated devices were the actual physical devices. Hypervisor 114 is responsible for taking requests from such device drivers and translating the requests into corresponding requests for real device drivers in a device driver layer of hypervisor 114. The device drivers in the device driver layer then communicate with real devices in hardware platform 104.

Any of VMs 120 may execute a nested hypervisor 145 which, itself, can execute additional "nested" VMs 121. A nested hypervisor 145 acts similarly to hypervisor 114 that is not nested. More specifically, just as non-nested hypervisor 114 runs on top of hardware platform 104 in order to execute VMs 120, nested hypervisor 145 runs on top of virtual hardware platform 122 to execute nested VMs 121. As with non-nested hypervisors 114, nested hypervisors 145 execute a set of virtual machine managers (not shown) to execute nested VMs 121.

It should be recognized that the various terms, layers and categorizations used to describe the virtualization components in FIG. 1 may be referred to differently without departing from their functionality or the spirit or scope of the invention. For example, virtual hardware platforms 122 may be considered to be part of virtual machine monitors (VMM) $140_1$-$140_N$ which implement the virtual system support needed to coordinate operations between hypervisor 114 and their respective VMs. Alternatively, virtual hardware platforms 122 may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Computing system 100 may include a virtualization management module 144 that may communicate to hosts 102 via network 150, sometimes referred to as a management network. In one embodiment, virtualization management module 144 is a computer program that resides and executes in a central server, which may reside in computing system 100, or alternatively, running as a VM in one of hosts 102. One example of a virtualization management module is the vCenter® Server product made available from VMware, Inc. Virtualization management module 144 is configured to carry out administrative tasks for computing system 100, including managing hosts 102, managing VMs running within each host 102, provisioning VMs, migrating VMs from one host to another host, and load balancing between hosts 102.

Hypervisors 114 executing on different host computers 102 execute high-availability agents (HA agents) 146 for providing high-availability (HA) functionality that provides automatic failover for VMs 120 executing in a cluster 101 of hosts. As stated above, high-availability refers to the ability to restart VMs 120 on a different host computer 102 upon detecting that the host computer originally executing VMS 120 has failed. Hypervisors 114 cooperate, via HA agents 146 and datastore 138, to provide the high-availability functionality.

HA agents 146 perform several functions to provide this high-availability functionality including initial election of a host commuter 102 to act as master within a cluster 101, detecting when the host computer acting as master has failed, election of a new master when the host computer acting as master has faded, restarting VMs 120 executed by the failed host computer acting as master, and other associated tasks.

Host computers 102 are organized into and included within a cluster 101 of host computers 102. A cluster is defined as a collection of more than one host computer 102, each of which has access to a shared storage device such as storage array 134, and that operate together to provide services such as execution of VMs 120 and failover services.

When a cluster 101 is initialized, host computers 102 initialize hypervisors 114 and HA agents 146 within hypervisors 114. Upon initialization, HA agents 146 cooperate to elect host computers 102 to serve as master. In some embodiments, a cluster includes only a single master host computer 102, with others acting as slave host computers 102. Thus, master election involves choosing a single host computer 102 within a cluster 101 to act as master. Master election may be made by considering several factors such as available computing resources, available data store, available memory, hardware type, and the like. In some embodiments, any host computer 102 within a cluster 101 has the capability of acting as a master host computer 102 when elected to do so.

Once a master host has been elected, that master host executes VMs 120. To enable failover of VMs 120, HA agent 146 within the host computer acting as master maintains, within VM directories 151, state information for VMs 120 executing in the host computer acting as master. The state information may include one or more virtual disk files (e.g., VMDK files) that store the contents of a source VMs virtual hard disk drive 130, VM-related configuration files (e.g., ".vmx" files), a paging file (e.g., "vmem" files) which backs up a source VMs memory on the host file system (i.e., in cases of memory over-commitment), and log files of the VM's activity, as well as other types of state information. The state information is used by a hypervisor 114 executing on a host computer 102 acting as a slave to perform failover when a host computer 102 acting as master has failed.

Heartbeat file 152 is used by HA agents 146 to determine when a host computer 102 acting as master has failed. More specifically, for any particular host computer 102 that is acting as a master host computer, HA agent 146 executing within the hypervisor of that host computer 102 frequently (e.g., periodically or according to a schedule) writes a "keepalive" message to a heartbeat entry within heartbeat file 152 to indicate that the host computer acting as master is still available. The keepalive message informs other HA agents 146 that the host computer acting as master is still available and that an HA agent 146 within a hypervisor 114 of a host computer 102 acting as a slave should not begin executing the VMs of the host computer acting as a master. When a host computer 102 acting as a master becomes unavailable, (e.g., due to loss of network connectivity or due to another failure), host computer 102 no longer writes the keepalive message into heartbeat file 152.

HA agents 146 executing within a hypervisor 114 of host computers 102 acting as slave periodically examine heartbeat file 152 to determine whether host computer 102 acting as master has updated a corresponding heartbeat entry with a keepalive message. If HA agents 146 for slave host computers 102 find a keepalive message when such a message should exist (i.e., find that a keepalive message exists for the most recent time slot), then the master host computer continues to operate as master and the slave host computers do not perform tasks for a failover operation. However, if the HA agent of the slave host computer does not find a keepalive message for the master host computer when such a keepalive message is scheduled to exist, then the HA agents of the slave host computers determine that the master host computer is unavailable. When these HA agents 146 determine that the master host computer is unavailable, the HA agents elect a new master in a process similar to when host computers 102 in the cluster 101 are initialized. This newly elected master host computer restarts the VMs 120 that were executing in the now unavailable master host computer 102.

As described above, VMs 120 executing in a host computer may execute a guest operating system 141 as well as applications "on top" of guest operating system 141, in an application layer 142. VMs 120 may also execute a nested hypervisor 145, which is a hypervisor executing within a VM 120 (rather than directly within a physical host computer 102). In the past, nested hypervisors were generally unable to participate in the high availability process because the high availability process relies on the physical nature of the host computers. More specifically, when a host computer acting as master becomes unavailable, the physical nature of another host computer means that that host computer would be able to substitute as master. A virtual machine acting as host would generally not have the capability to substitute as master for many reasons including the fact that such a virtual machine would not be able to operate without the presence of a physical host computer. For these reasons, in the past, a high availability agent was typically not executed in a nested hypervisor.

Thus, techniques are provided herein for providing failover capability for VMs 121 executing within a nested hypervisor 145. When virtualization management module 144 provisions a VM 120 to execute a nested hypervisor 145, virtualization management module 144 checks whether hypervisor 114 on which the provisioned VM is executing an HA agent 146. If that hypervisor 114 is executing an HA agent 146, then virtualization management module 144 causes nested hypervisor 145 to execute a nested high availability agent 147 ("nested HAA"). The purpose of nested high availability agent 147 is to restart VMs 121 executing on nested hypervisor 145 in the event of a failover operation.

Note that because of the special nature of nested hypervisors 145, nested high availability agents 147 function in a somewhat different manner than high availability agents 146 executing on a non-nested hypervisor 114. More specifically, although nested high availability agent 147 views the VM on which it is executing in a similar manner as high availability agents 146 view physical host: computers 102, high availability agents 146 (and nested high availability agents 147) will not elect such VMs 120 to act as master. Nor will such VMs 120 act as slave.

Further, while high availability agents 146 that are executing in non-nested hypervisors 114 (also referred to herein as "non-nested HA agents 146") are configured to participate in master election, nested HAAs 147 are not configured to participate in master election. This is because non-nested HA agents 146 are, in essence, representing physical host computers 102, which can act as master host computers 102, including performing all attendant functionality such as executing VMs 120, and the like. However, a VM 120 executing a nested hypervisor 145 is not a physical host but a virtual host and thus should not participate in master election.

Nested HA agents 147 participate in the heartbeat process in a modified manner as well. In operation, a nested HA agent 147 periodically updates a heartbeat entry in heartbeat file 152 to indicate that the VM on which the HA agent is running is still available. When a host computer 102 has failed, a VM 120 running a nested hypervisor 145 with nested HA agent 147 also fails and thus stops updating the associated heartbeat entry. Thus, a nested HA agent 147 also periodically reads the heartbeat entry associated with the VM on which the nested HA agent 147 executes. If nested HA agent 147 detects that the heartbeat entry for that VM 120 has not been updated when the heartbeat entry should have been (e.g., according to a schedule), then a host computer 102 is deemed unavailable, and nested HA agent 147 restarts nested VMs 121 that were executing on the corresponding nested hypervisor 145 of the now unavailable host computer 102.

FIGS. 2A-2D illustrate a technique for failover in which a master host computer 102 becomes unavailable and a host computer 102 acting as slave restarts VMs including those executing within nested hypervisors 145, according to an example. Note that in FIGS. 2A-2D, for simplicity, various elements of FIG. 1, such as host computers 102, hypervisors 114, VMs 120, and the like, are illustrated in simplified form, without various internal elements, such as hardware platform 104, virtual hardware platform 122, or the like. Additionally, for simplicity, only three host computers 102 are illustrated, although more or fewer host computers 102 may be used. FIGS. 2A-2D illustrate a heartbeat file 152 within storage array 134. Heartbeat file 152 stores keepalive messages received from high availability agents. The column labeled "hypervisor ID" indicates hypervisor 114 ("Hx") or nested hypervisor 145 ("NHx") in which the high availability agent is running and the column labeled "keepalive" indicates whether a keepalive message has been received in the most recent slot. The possible values for "keepalive" include "Yes," "No," and "N/A." Note that these values logically indicate whether a keepalive message has been received in the most recent timeslot (e.g., according to a schedule) and do not necessarily indicate the exact format of the data stored in heartbeat file 152 (which may be, for example, a timestamp).

Figure 2A:
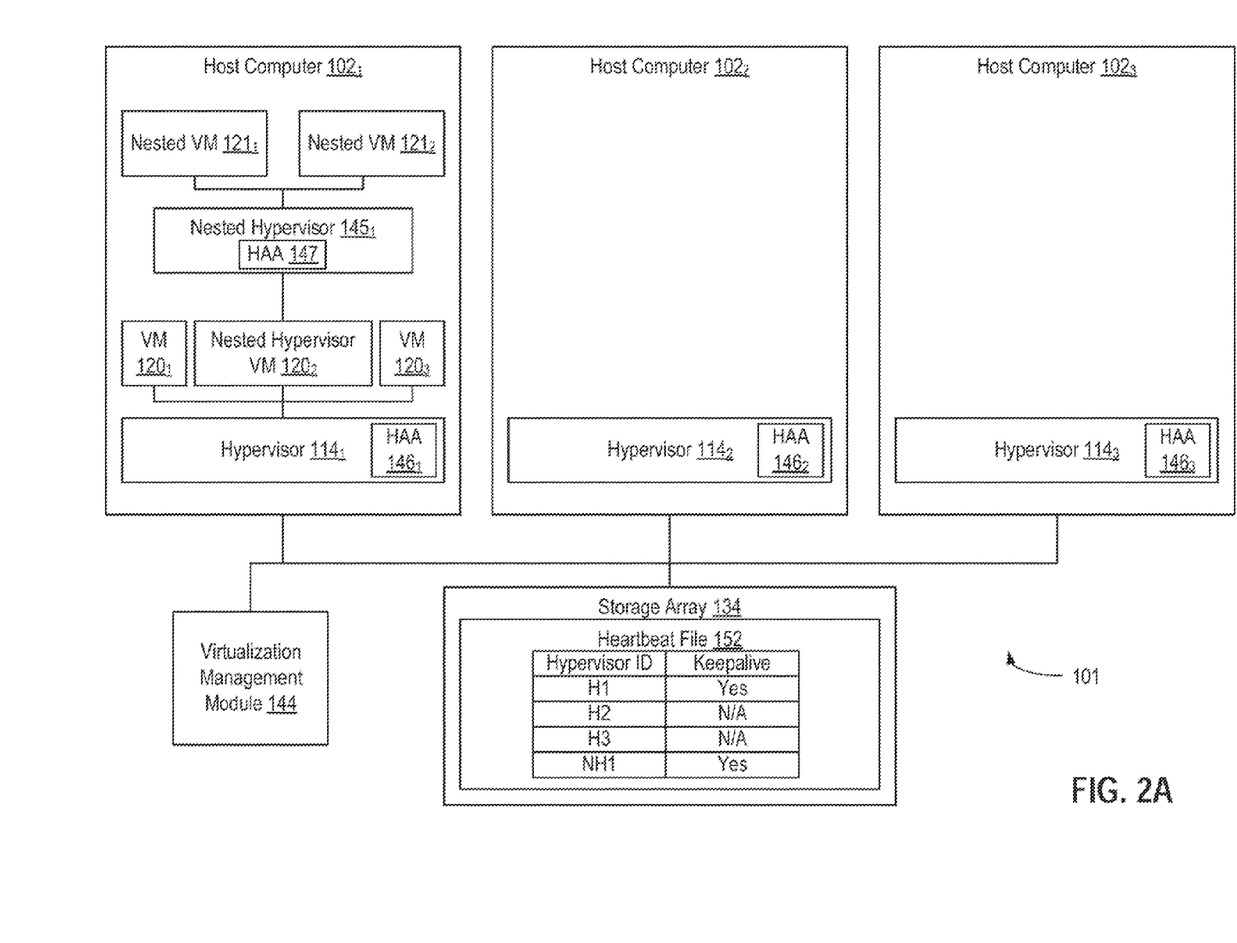
FIGS. 2A-2D illustrate a technique for failover involving restarting virtual machines executing in nested hypervisors, according to an example.

FIG. 2A shows virtualized computing system 100 in a state in which host computer $102_1$ is acting as a master host computer 102 and is thus executing several VMs 120 on top of a hypervisor $114_1$. Note that prior to the state illustrated in FIG. 2A, host computers 102 in cluster 101 elected host computer 102 as master computer. VM $120_2$ referred to herein as a "nested hypervisor VM," as it is executing nested hypervisor $145_1$. Nested hypervisor $145_1$ is executing nested VM $121_1$ and $121_2$. Because host computer $102_1$ is available, both hypervisor $114_1$ (via high availability agent $146_1$) and nested hypervisor $145_1$ (via nested high availability agent $147_1$) are periodically writing keepalive messages to heartbeat file 152. High availability agent $146_2$ and/or high availability agent $146_3$ periodically read heartbeat file 152 to verify that host computer $102_1$ is still available. Because the keepalive message for hypervisor $114_1$ exists in heartbeat file 152, high availability agents for both host computer $102_2$ and host computer $102_3$ determine that host computer $102_1$ is still available. Thus, host computer $102_2$ and host computer $102_3$ are prevented from becoming a master host computer.

Figure 2B:
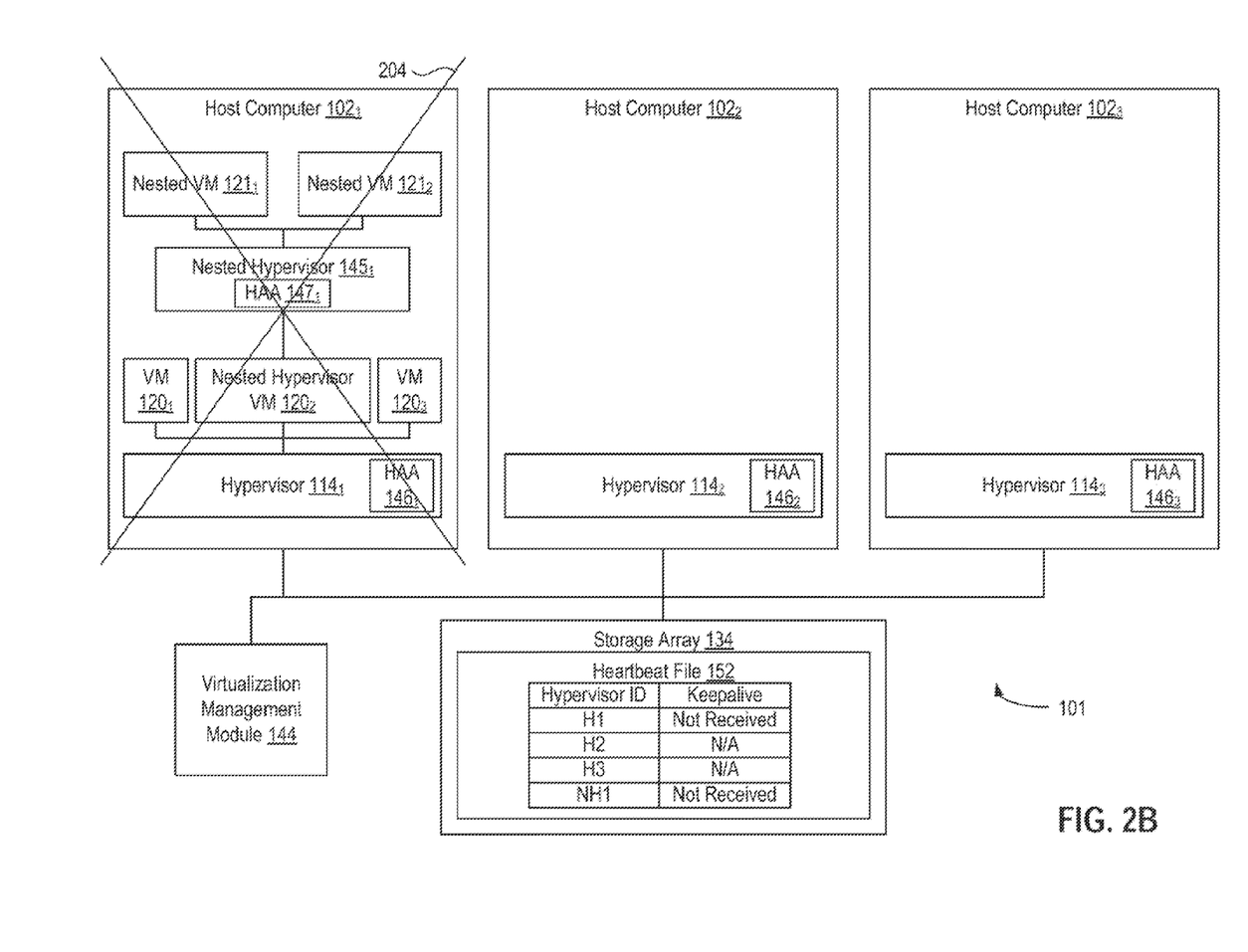

FIG. 2B shows virtualized computing system 100 in a state in which host computer $102_1$ has become unavailable (indicated with unavailability marker 204). Due to this unavailability, neither hypervisor $114_1$ nor nested hypervisor $145_1$ have written a keepalive message to their respective heartbeat the entries within heartbeat file 152. Thus, heartbeat file 152 indicates that keepalive messages for hypervisor $114_1$ and nested hypervisor $145_1$ are not received in a most recent time slot. High availability agent $146_2$, for host computer $102_2$ and high availability agent $146_3$ for host computer $102_3$ read heartbeat the 152 and detect that a keepalive message has not been received for hypervisor $114_1$. In response, high availability agent $146_2$ and high availability agent $146_3$ elect host computer $102_2$ to serve as master, based on various criteria such as hardware capability and the like. Subsequently, host computer $102_2$, now serving as master, and having determined that host computer $102_1$ is unavailable, begins starting up VMs 120 that were executing in hypervisor $114_1$. This includes VM $120_1$ and VM $120_3$ that do not execute nested hypervisors 145 as well as "nested hypervisor VM $120_2$" that executes nested hypervisor $145_1$.

Figure 2C:
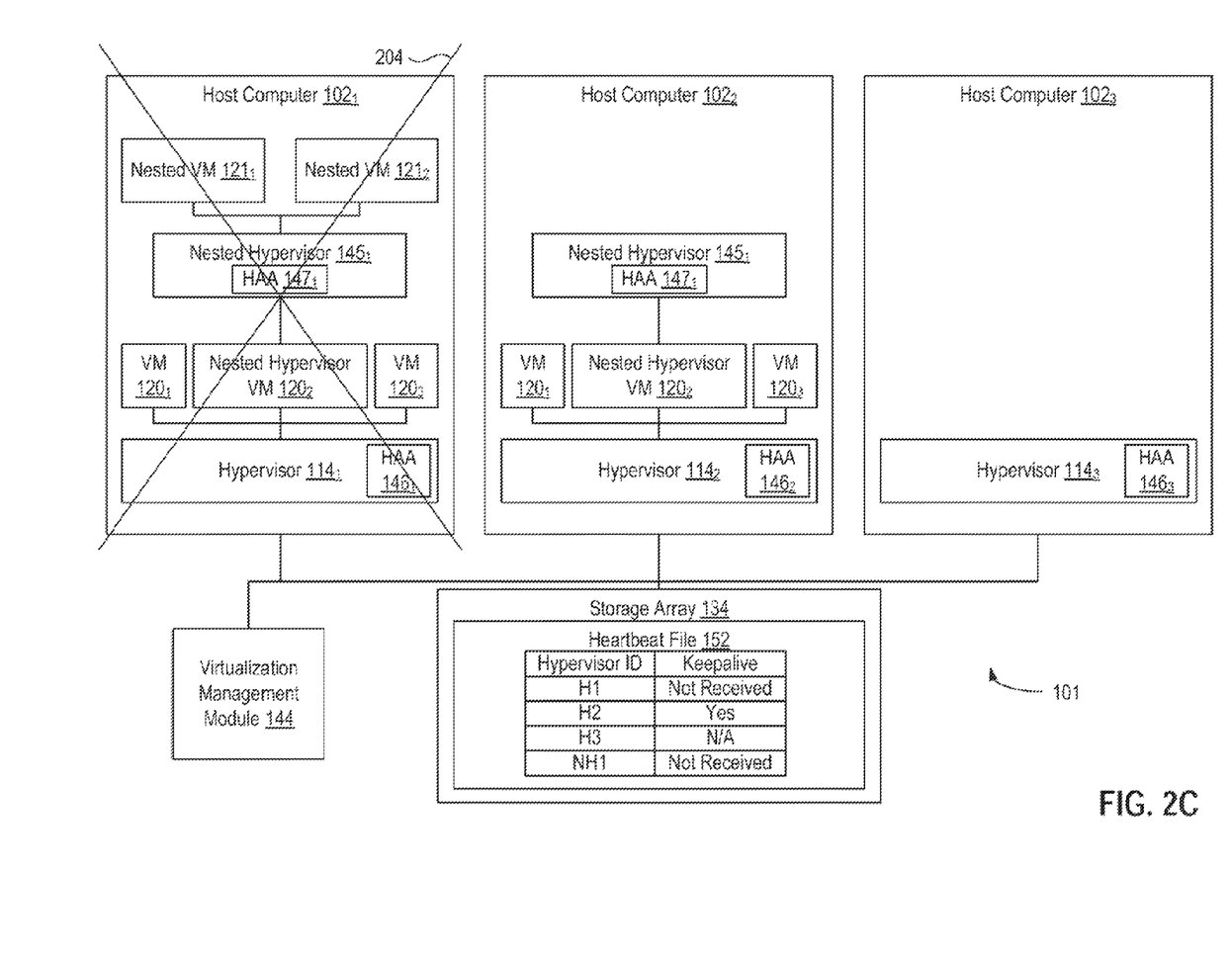

FIG. 2C shows virtualized computing system 100 in a state in which hypervisor $114_2$ has started up VMs 120 that had been executing on hypervisor $114_1$, in the now unavailable host computer $102_1$. These VMs 120 include VM $120_1$, nested hypervisor VM $120_2$, and VM $120_3$.

When high availability agent $146_2$ starts up VMs 120, high availability agent $146_2$ checks whether VMs 120 were executing a nested hypervisor $120_2$ that was executing a nested high availability agent 147 (in other words, high availability agent $146_2$ checks whether high availability was enabled for VMs 120). If a VM 120 was executing a nested hypervisor 145 executing a high availability agent 147, then high availability agent 146 starts a high availability agent 147 for that newly started VM 120 executing in hypervisor $114_2$. If VM 120 was not executing a nested hypervisor 135 or was executing a nested hypervisor 145 that was not executing a high availability agent 147, then high availability agent 146 does not start a high availability agent 147 for VM 120. Because neither VM $120_1$ nor VM $120_3$ were executing a nested hypervisor 145 or a high availability agent 147 when in host computer $102_1$, high availability agent $146_2$ does not start a high availability agent 147 for those VMs 120. However, because VM $120_2$ was executing a high availability agent 147, high availability agent $146_2$ starts a high availability agent 147 within nested hypervisor $145_1$ for VM $120_2$.

Figure 2D:
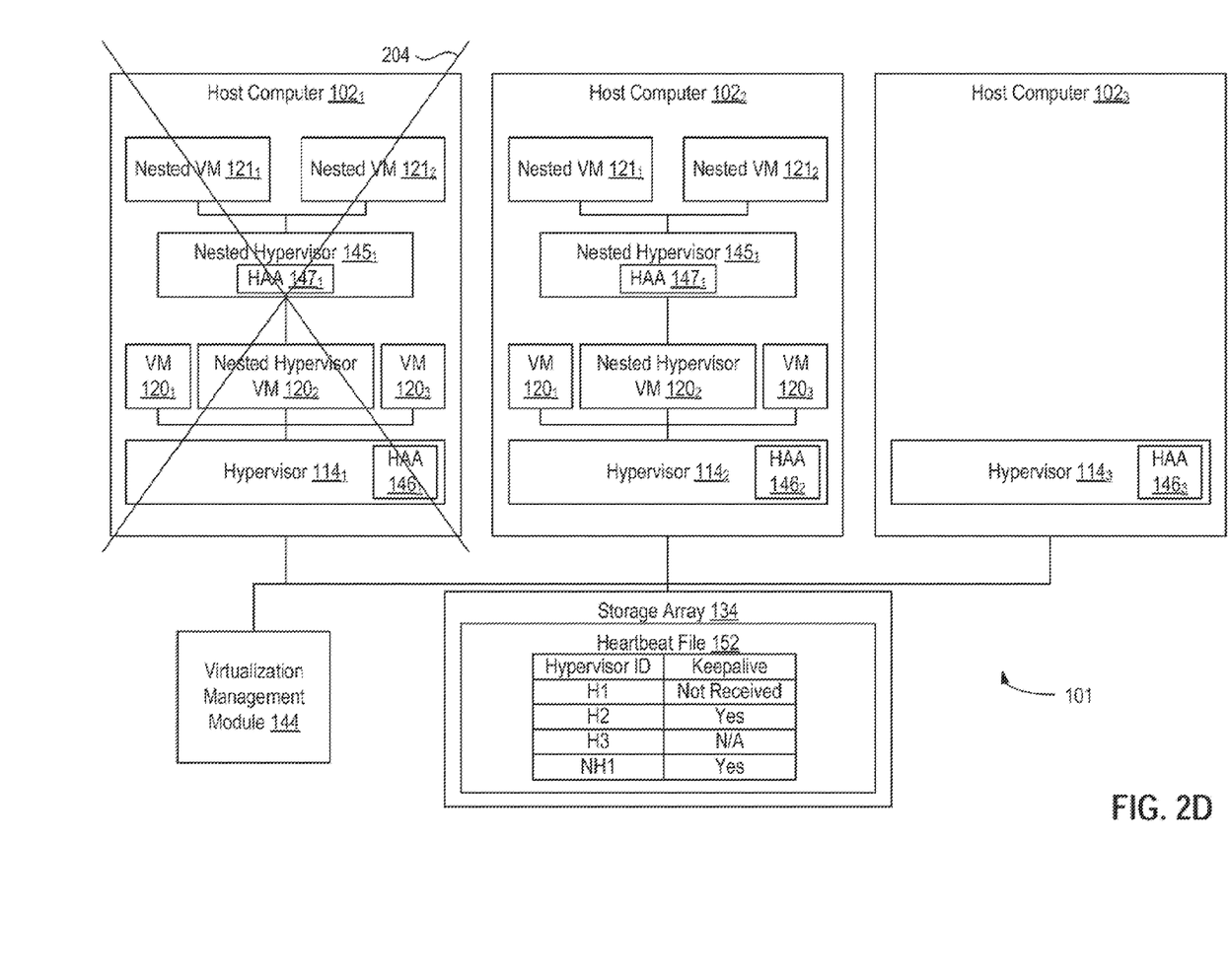

FIG. 2D shows virtualized computing system 100 in a state in which nested hypervisor VM $120_1$ is executing nested hypervisor $145_1$, which starts nested VMs 121. After the state shown in FIG. 2C, high availability agent $147_1$ checks the heartbeat entry corresponding to nested hypervisor $145_1$ and determines that the heartbeat entry indicates that a keepalive message has not been received. In response, high availability agent $147_1$ starts executing nested VMs 121 that were executing host computer $102_1$. After this, high availability agent $147_1$ begins sending keepalive messages to heartbeat file 152 to indicate that nested hypervisor $145_1$ is available.

Figure 3:
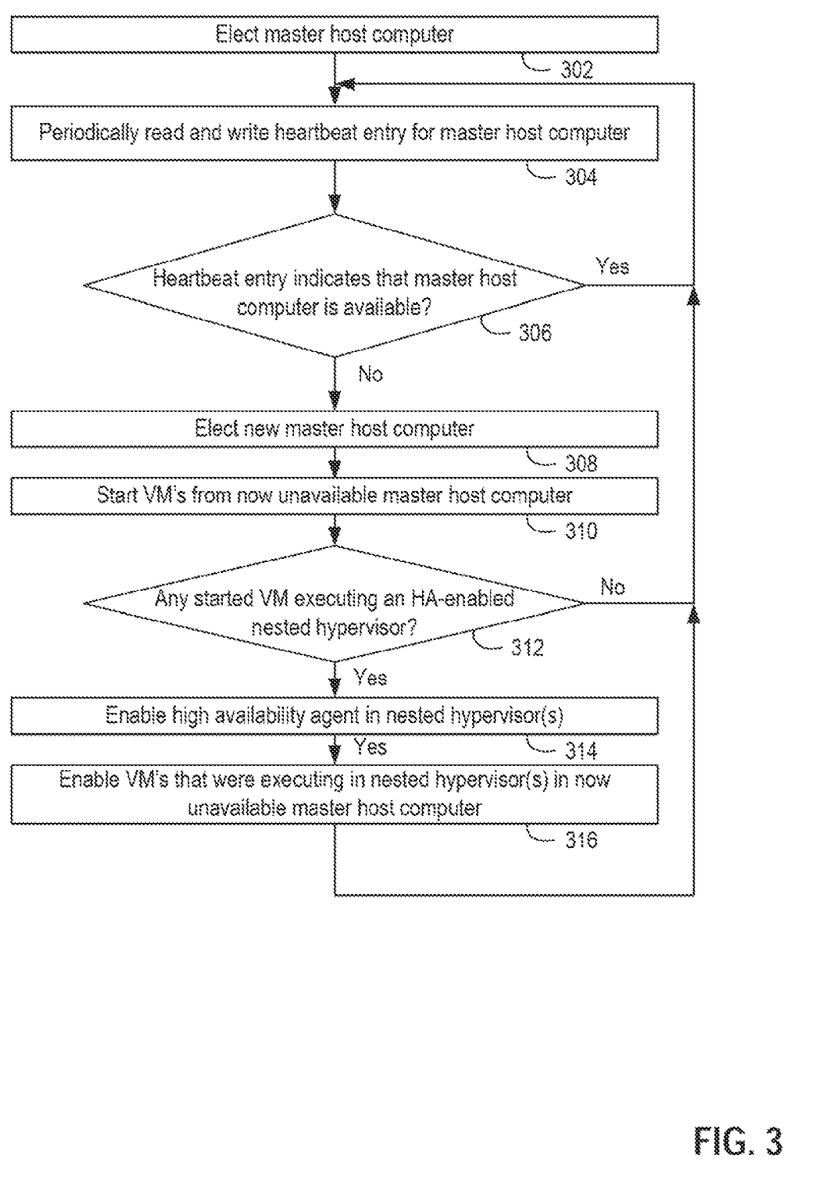
FIG. 3 is a flow diagram that illustrates steps for a method of performing a failover operation for a nested hypervisor and virtual machines within the nested hypervisor, according to an example.

FIG. 3 is a flow diagram that illustrates steps for a method 300 of performing a failover operation for a nested hypervisor and virtual machines within the nested hypervisor, according to an example. It should be recognized that, even though the method is described in conjunction with the system of FIGS. 1 and 2A-2D, any system configured to perform the method steps, in any technically feasible order, is within the scope of the present disclosure.

As shown, as method 388 begins at step 302, where host computers 102 (e.g., via high availability agents 146) within cluster 101 elect a mater host. This election can be performed based on the hardware capabilities of host computers 102 such as computing resources, amount of data stores available, amount of processing power available, and the like, or based on any technically feasible technique and/or criteria. At step 304, once a master is elected, the master writes keepalive messages to a heartbeat file 152 in a shared storage array 134 to indicate that the master is still available. In various embodiments, the master host 102 may write to heartbeat file 152 periodically, according to a non-periodic schedule, or in any other technically feasible manner. The host computers acting as slaves read the heartbeat entry within heartbeat file 152 for the keepalive message of the master host computer, in order to determine whether the host computer acting as master is still available.

At step 306, one or more host computers 102 acting as slaves (e.g., via high availability agents 146) determine whether the read heartbeat entry indicates that the host computer 102 acting as master is still available. In various embodiments, host computers 102 acting as slaves may determine that a master is unavailable based on the timing with which keepalive messages have been written to heartbeat file 152. More specifically, each host computer 102 may be aware of the schedule with which the master host computer is to write keepalive messages to heartbeat file 152. If a keepalive message does not exist for the master host computer for a most recent time slot according to the schedule, then the slave host computers determine that the master host computer has become unavailable. If host computers 102 acting as slaves determine that host computer 102 acting as master is still available, then the method returns to step 304. If host computers 102 acting as slaves determine that host computer 102 acting as master is no longer available, then the method proceeds to step 308.

At step 308, the host computers acting as slaves elect a new host computer 102 to act as master. This election may be done as described above. More specifically, host computers 102 may choose a master based on the hardware capabilities of host computers 102, or in any other technically feasible manner.

At step 310, once a new master has been elected, a high availability agent 146 running on hypervisor 114 of the new master reads VM directories 151 to determine state and other information for VMs 120 that were executing on now unavailable host computer 102 that previously acted as master. High availability agent 146 starts those VMs 120 on host computer 102 now acting as master.

At step 312, high availability agent 146 running on hypervisor 114 checks the now started VMs 120 to determine whether any are executing a high-availability-enabled nested hypervisor 145 (that is, a nested hypervisor 145 executing a high availability agent 147). If one or more VMs 120 is executing an HA-enabled nested hypervisor 145, then the method proceeds to step 314 and if no VM 120 is executing an HA-enabled nested hypervisor 145, then the method returns to step 304.

At step 314, high availability agent 146 executing in hypervisor 114 of host computer 102 acting as master enables a high availability agent 147 in VM 120 executing the nested hypervisor 145. This high availability agent 147 is a modified version of high availability agent 146. More specifically, unlike high availability agent 146, high availability agent 147 does not participate in master election and master election cannot designate VM 120 executing the nested hypervisor 145 as a master. Further, the VM 120 executing nested hypervisor 145 cannot act as a slave.

At step 316, high availability agent 147 in nested hypervisor 145 restarts the nested VMs 121 that were executing in the nested hypervisor 145 on the now unavailable master host computer. As with VMs 120 restarted by high availability agents 146, high availability agent 147 restarts nested VMs 121 by examining VM directories 151 for state for the VMs 121 and restarting VMs 121 based on that state. After step 316, the method 300 returns to step 304.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specialty constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may he implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as El single instance. Finally, boundaries between various components, operations and data stores are somewhat arbitrary, and particular operations are illustrated in the context of specific illustrative configurations. Other allocations of functionality are envisioned and may fall within the scope of the invention(s). in general, structures and functionality presented as separate components in exemplary configurations may be implemented as a combined structure or component. Similarly, structures and functionality presented as a single component may be implemented as separate components. These and other variations, modifications, additions, and improvements fall within the scope of the appended claims(s).

What is claimed is:

1. A method, comprising:
   storing, within a shared storage device that is shared between a cluster of hosts, a heartbeat file configured to indicate availability status for hypervisors executing on physical hosts and nested hypervisors executing on virtual machines (VMs);
   detecting, based on the heartbeat file, that a first nested hypervisor that is included within the nested hypervisors, that is executing a first virtual machine (VM), and that is executing on a first host within the cluster of hosts has become unavailable; and
   in response to determining that the first nested hypervisor has become unavailable, starting the first VM within a second nested hypervisor executing on a second host within the cluster of hosts.

2. The method of claim 1, wherein detecting that the first VM has become unavailable comprises:
examining a heartbeat entry of the heartbeat file to determine that a high availability agent associated with the first nested hypervisor has not updated the heartbeat entry as scheduled.

3. The method of claim 2, further comprising:
periodically writing to the heartbeat entry of the heartbeat file to indicate that the first nested hypervisor is available.

4. The method of claim 1, further comprising:
excluding the first nested hypervisor from acting as a master host; and
electing, from the cluster of hosts, the first host as a master host and the second host as a slave host,
wherein the slave host is configured to substitute for the master host when the master host become unavailable.

5. The method of claim 4, further comprising:
excluding the first nested hypervisor from a set of hosts configured to elect the master host.

6. The method of claim 1, further comprising:
prior to detecting that the first nested hypervisor has become unavailable, detecting, based on the heartbeat file, that a first hypervisor executing a second VM that is executing the first nested hypervisor has become unavailable; and
in response, starting the second VM within a second hypervisor executing on the second host.

7. The method of claim 6, further comprising:
detecting that the first nested hypervisor associated with the second VM is a nested hypervisor; and
in response, executing a high availability agent in the second nested hypervisor.

8. The method of claim 1, further comprising:
determining that high availability is enabled for a first hypervisor executing a second VM that is executing the first nested hypervisor, and
in response, enabling high availability for the first nested hypervisor.

9. A computer system, comprising:
a first hardware computing platform configured to execute a first hypervisor, the first hypervisor configured to execute:
a first virtual machine (VM) configured to execute a first nested hypervisor that is configured to execute a first nested high availability agent, and
a first high availability agent;
a second hardware computing platform configured to execute a second hypervisor, the second hypervisor configured to execute a second high availability agent; and
a shared storage device configured to be accessed by both the first hardware computing platform and the second hardware computing platform,
wherein the first hardware computing platform and the second hardware computing platform are included within a cluster,
wherein the first hardware computing platform and the second hardware computing platform are part of a cluster of hardware computing platforms,
wherein each of the first high availability agent, the first nested high availability agent, and the second high availability agent are configured to update a heartbeat file stored in the shared storage device, the heartbeat file configured to indicate availability status for hypervisors executing on hardware computing platforms and nested hypervisors executing on virtual machines,
wherein the second hardware computing platform is configured to detect, based on the heartbeat file, that the first virtual machine has become unavailable, and
wherein the second hardware computing platform is configured to, in response to detecting that the first virtual machine has become unavailable, start the first virtual machine with a second nested hypervisor executing within a second virtual machine configured to execute on the second hypervisor.

10. The computer system of claim 9, wherein the second hardware computing platform is configured to detect that the first VM has become unavailable by:
examining a heartbeat entry of the heartbeat file to determine that a high availability agent associated with the first nested hypervisor has not updated the heartbeat entry as scheduled.

11. The computer system of claim 10, wherein the first nested high availability agent is configured to:
periodically write to the heartbeat entry of the heartbeat file to indicate that the first nested hypervisor is available.

12. The computer system of claim 9, wherein:
the first high availability agent and the second high availability agent are configured to cooperate to exclude the first nested hypervisor from acting as a master host and to elect, from the cluster, the first hardware computing platform as a master host and the second hardware computing platform as a slave host,
wherein the slave host is configured to substitute for the master host when the master host become unavailable.

13. The computer system of claim 12, wherein:
the first high availability agent and the second high availability agent are configured to exclude the first nested hypervisor from a set of hosts configured to elect the master host.

14. The computer system of claim 9, wherein the second high availability agent is configured to:
prior to detecting that the first virtual machine has become unavailable, detect, based on the heartbeat file, that the first hypervisor has become unavailable, and
in response, start the second VM within the second hypervisor.

15. The computer system of claim 14, wherein the second high availability agent is configured to:
detect that the first nested hypervisor associated with the second VM is a nested hypervisor; and
in response, execute a high availability agent in the second nested hypervisor.

16. The computer system of claim 9, wherein the second high availability agent is configured to:
determine that high availability is enabled for the first nested hypervisor, and
in response, enable high availability for the first nested hypervisor.

17. A non-transitory computer-readable medium storing instructions that, when executed by a processor, cause the processor to perform a method, the method comprising:
storing, within a shared storage device that is shared between a cluster of hosts, a heartbeat file configured to indicate availability status for hypervisors executing on physical hosts and nested hypervisors executing on virtual machines (VMs);
detecting, based on the heartbeat file, that a first nested hypervisor that is included within the nested hypervisors, that is executing a first virtual machine (VM), and that is executing on a first host within the cluster of hosts has become unavailable; and in response to determining that the first nested hypervisor has become unavailable, starting the first VM within a second nested hypervisor executing on a second host within the cluster of hosts.

18. The non-transitory computer-readable medium of claim 17, wherein detecting that the first VM has become unavailable comprises:
examining a heartbeat entry of the heartbeat file to determine that a high availability agent associated with the first nested hypervisor has not updated the heartbeat entry as scheduled.

19. The non-transitory computer-readable medium of claim 18, wherein the method further comprises:
periodically writing to the heartbeat entry of the heartbeat file to indicate that the first nested hypervisor is available.

20. The non-transitory computer-readable medium of claim 17, wherein the method further comprises:
excluding the first nested hypervisor from acting as a master host; and
electing, from the cluster of hosts, the first host as a master host and the second host as a slave host,
wherein the slave host is configured to substitute for the master host when the master host become unavailable.

* * * * *